United States Patent
Gong et al.

(10) Patent No.: US 11,300,499 B2
(45) Date of Patent: Apr. 12, 2022

(54) MULTI-CAVITY SEMI-OPEN RESONANT PHOTOACOUSTIC CELL AND MULTI-GAS SIMULTANEOUS MEASUREMENT SYSTEM

(71) Applicant: Dalian University of Technology, Dalian (CN)

(72) Inventors: Zhenfeng Gong, Dalian (CN); Tianli Gao, Dalian (CN); Yewei Chen, Dalian (CN); Qingxu Yu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 37 days.

(21) Appl. No.: 16/885,466

(22) Filed: May 28, 2020

(65) Prior Publication Data
US 2021/0018430 A1   Jan. 21, 2021

(30) Foreign Application Priority Data
Jul. 20, 2019 (CN) .......................... 201910657620.5

(51) Int. Cl.
*G01N 21/17* (2006.01)
*G01N 21/03* (2006.01)
*G01N 21/01* (2006.01)

(52) U.S. Cl.
CPC ......... *G01N 21/1702* (2013.01); *G01N 21/01* (2013.01); *G01N 21/0303* (2013.01); *G01N 2021/0378* (2013.01); *G01N 2021/1704* (2013.01); *G01N 2201/1241* (2013.01)

(58) Field of Classification Search
CPC ............... G01N 21/1702; G01N 21/01; G01N 21/0303; G01N 2021/0378; G01N 2021/1704; G01N 2201/1241
See application file for complete search history.

(56) References Cited

FOREIGN PATENT DOCUMENTS

CN    109374529 A  *  2/2019  ............. G01N 21/31

OTHER PUBLICATIONS

Liu K et al., entitled "Multi-resonator photoacoustic spectroscopy," Sensors and Actuators B: Chemical, vol. 251, Nov. 2017, pp. 632-636. Via internet at: https://www.sciencedirect.com/science/article/abs/pii/S0925400517309371 ?via%3Dihub.

* cited by examiner

Primary Examiner — Benjamin R Schmitt
(74) Attorney, Agent, or Firm — Amster, Rothstein & Ebenstein LLP

(57) ABSTRACT

The present invention belongs to the technical field of trace gas detection, and relates to a multi-cavity semi-open resonant photoacoustic cell and a multi-gas simultaneous measurement system. The photoacoustic cell includes multiple resonant cavities. Each resonant cavity has a unique length and a unique resonant frequency, so each resonant cavity corresponds to one to-be-measured gas. A sensitive diaphragm of an acoustic sensor is fixed on one end face of the photoacoustic cell. Photoacoustic signals of different frequencies generated in the resonant cavities act on the sensitive diaphragm of the acoustic sensor, causing the sensitive diaphragm of the acoustic sensor to vibrate periodically. Concentration information of multiple to-be-measured gases can be obtained by analyzing the vibration of the sensitive diaphragm of the acoustic sensor.

1 Claim, 2 Drawing Sheets

MULTI-CAVITY SEMI-OPEN RESONANT PHOTOACOUSTIC CELL AND MULTI-GAS SIMULTANEOUS MEASUREMENT SYSTEM

TECHNICAL FIELD

The present invention belongs to the technical field of trace gas detection, and relates to a multi-cavity semi-open resonant photoacoustic cell and a multi-gas simultaneous measurement system based on the photoacoustic cell.

BACKGROUND

The trace gas detection technology plays an important role in applications such as characteristic gas analysis for power system faults, respiratory gas detection in the medical field, and industrial harmful gas emission monitoring. At present, trace gas detection methods are mainly implemented by gas chromatography, semiconductor gas sensor, electrochemical sensor, absorption spectroscopy, and photoacoustic spectroscopy. Gas chromatography can simultaneously measure multiple gases with high sensitivity, but it needs to be used with carrier gas, the chromatographic column needs to be replaced regularly, and the maintenance cost of the instruments is relatively high. The semiconductor gas sensor and the electrochemical sensor are less costly, and their limit detection sensitivity can reach the parts-per-million (ppm) and parts-per-billion (ppb) levels, respectively. However, these two sensors have a short service life, and serious cross-interference exists between different gases. Because most gas molecules have absorption characteristic lines in the near- and mid-infrared spectral regions, the concentration of most gas molecules can be measured by using appropriate light sources and infrared absorption spectroscopy analysis methods. The measurement sensitivity of infrared absorption spectroscopy is directly proportional to the absorption path of detective gases. Generally, absorption spectroscopy requires a longer absorption cell.

With the development of laser technologies, photoacoustic spectroscopy has become a gas detection method with high sensitivity, fast response, and strong selectivity. Photoacoustic spectroscopy is a kind of spectral calorimetry technology that directly measures the thermal energy generated by the absorption of light energy. It is a background-free absorption spectroscopy technology. The basic principle is as follows: When a periodic modulation light source covers the absorption line of to-be-measured gas molecules, the gas molecules transit from a ground state to an excited state, and then return to the ground state through the non-radiative transition emitting heat, so that the gas molecules periodically expand to generate sound waves. Because the amplitude of the sound wave is proportional to the concentration of the to-be-measured gas, the concentration information of the to-be-measured gas can be obtained by detecting a photoacoustic signal through an acoustic sensor.

At present, trace gas detection systems based on photoacoustic spectroscopy can be divided into two categories according to different working models: resonant photoacoustic systems and non-resonant photoacoustic systems. A resonant photoacoustic cell has a high sensitivity, and can achieve resonant amplification of sound waves. In a laser-based resonance photoacoustic system, a modulation frequency of an excitation light source needs to be matched with the resonance frequency of a photoacoustic cell. The concentration information of a to-be-measured gas can be obtained by detecting a photoacoustic signal at this frequency with an acoustic sensor. Due to the narrow line width of lasers, normally, one laser can only measure one gas. If multiple gases need to be measured, multiple lasers need to be connected in parallel. In the experiment, turn on a periodically modulated laser, measure a first to-be-measured gas, and turn off the laser. Then turn on a laser corresponding to a second to-be-measured gas. Repeat this process to measure multiple gases. However, this method increases the system complexity and the response time of multi-gas measurement. The paper (Liu K, Mei J, Zhang W, et al. Multi-resonator photoacoustic spectroscopy [J]. Sensors and Actuators B: Chemical, 2017, 251: 632-636.) proposes a multi-gas simultaneous measurement solution. The photoacoustic cell in this solution has three resonant cavities. Due to different lengths of the resonant cavities, the first-order resonant frequencies of the three resonant cavities are 1400 Hz, 1510 Hz, and 1610 Hz, respectively. Three lasers are turned on at the same time to measure carbon dioxide, methane, and water gas, respectively, and one acoustic sensor is used to simultaneously detect the photoacoustic signals in the three resonant cavities to realize simultaneous measurement of the three gases. However, the photoacoustic cell needs an opening in the middle of each resonant cavity, that is, an antinode position of the acoustic wave signal, for use of the acoustic sensor. This increases the processing difficulty of the photoacoustic cell. In addition, two buffer chambers are large, which increases the gas equilibrium time and the system response time. Therefore, designing a multi-gas simultaneous measurement photoacoustic system featuring easy processing and installation and fast response has great value in the field of multi-gas detection.

SUMMARY

The present invention proposes a multi-cavity semi-open resonant photoacoustic cell structure and a multi-gas simultaneous measurement system based on the photoacoustic cell, to implement simultaneous and rapid measurement of multiple gases. This method can not only realize the simultaneous and rapid measurement of multiple gases, but also reduce the processing difficulty of the photoacoustic cell, the gas equilibrium time, and the required gas sample volume. It expands the application of the photoacoustic spectroscopy detection technology in the field of multi-gas detection.

The present invention has the following technical solutions.

A multi-cavity semi-open resonant photoacoustic cell is of a semi-open cavity resonant photoacoustic cell structure, which includes a cylindrical metal housing 1, multiple resonant cavities 2, a buffer chamber 3, a sensitive diaphragm 4 of an acoustic sensor, an optical glass window sheet 5, an air inlet 6, and an air outlet 7.

The metal housing 1 includes the multiple resonant cavities 2. Each resonant cavity 2 has a unique length and a unique resonant frequency, so each resonant cavity 2 corresponds to one to-be-measured gas. The metal housing 1 is a cylinder, with the sensitive diaphragm 4 of the acoustic sensor fixed on one end face. Photoacoustic signals of different frequencies generated in the multiple resonant cavities 2 act on the sensitive diaphragm 4 of the acoustic sensor, causing the sensitive diaphragm 4 of the acoustic sensor to vibrate periodically. The buffer chamber 3 is provided on the other side of the multiple resonant cavities 2, and the optical glass window sheet 5 is installed at the edge of the buffer chamber 3 to allow excitation light to pass. The air inlet 6 and the air outlet 7 are respectively provided on the side walls near the two ends of the photoacoustic cell.

Each resonance cavity is also provided with an air inlet 6 at a position close to the sensitive diaphragm 4 of the acoustic sensor, to increase the gas exchange efficiency.

The excitation laser whose modulation frequency matches with the resonance frequency of the photoacoustic cell enters into the resonance cavity 2 through the optical glass window sheet 5. Due to the use of a semi-open resonant photoacoustic cell, an antinode position 14 of the photoacoustic signal in the resonant cavity 2 is located at the edge of the resonant cavity 2, and the sensitive diaphragm 4 of the acoustic sensor is fixed at the antinode position 14. In this case, no openings are required in the resonant cavity 2, which reduces the processing difficulty of the photoacoustic cell. The lengths of the resonant cavities 2 are different, therefore the resonant frequencies of the resonant cavities are different. Due to the photoacoustic effect, photoacoustic signals with the same frequencies as the resonance frequencies of the resonant cavities 2 are generated in the resonant cavities 2. The generated photoacoustic signals of multiple frequencies cause the sensitive diaphragm 4 of the acoustic sensor to vibrate periodically. Concentration information of various to-be-measured gases can be obtained by analyzing the vibration of the sensitive diaphragm 4 of the acoustic sensor. Each resonant cavity 2 in the photoacoustic cell corresponds to one to-be-measured gas. Therefore, multiple gases can be measured simultaneously by increasing the number of resonant cavities 2.

A multi-gas simultaneous detection system based on a multi-cavity semi-open resonant photoacoustic cell includes multiple lasers 8, a multi-cavity semi-open resonant photoacoustic cell 9, an acoustic sensor 10, a phase-locked amplifier 11, a data acquisition card 12, and a computer 13. Taking a three-cavity semi-open resonant photoacoustic cell as an example, the computer 13 enables three lasers 8 with different center wavelengths to emit periodically modulated narrowband light. The three narrowband light beams pass through the optical glass window sheet 5 and respectively enter the three resonant cavities 2 in the multi-cavity semi-open resonant photoacoustic cell 9. Due to the photoacoustic effect, the acoustic sensor 10 detects three acoustic wave signals of different frequencies. After being processed by the phase-locked amplifier 11, the acoustic wave signals are collected by the data acquisition card 12 and finally enter the computer 13. The three lasers work simultaneously, and the photoacoustic cell employs a semi-open resonant photoacoustic cell structure, which reduce the volume of a gas path and the equilibrium time of gases. Therefore, the system can measure multiple gases simultaneously and rapidly.

The design theory of the present invention is as follows: In a traditional resonant photoacoustic cell, a buffer chamber is provided at each end of a resonant cavity, the center of the resonant cavity is an antinode position of an acoustic wave signal, two edge positions of the resonant cavity are node positions of the acoustic wave signal, and an acoustic sensor is placed in the center of the resonant cavity. Therefore, an opening is required at the center of the resonant cavity to use the acoustic sensor. For the semi-open resonant photoacoustic cell proposed in the present invention, a position where the resonant cavity and the buffer chamber are connected is a node position of an acoustic wave signal, and the other side of the resonant cavity is an antinode position of the acoustic wave signal. At this position, the acoustic wave signal reaches a maximum value and the acoustic sensor can be placed here to detect a largest photoacoustic signal.

The beneficial effects of the present invention are as follows: A multi-cavity semi-open resonant photoacoustic cell is proposed, which realizes the simultaneous and rapid measurement of multiple gases. The photoacoustic cell has a simpler structure and does not need an opening in the middle of each resonant cavity to use the acoustic sensor, thereby reducing the processing difficulty of the photoacoustic cell. Compared to the traditional resonant photoacoustic cell, the present invention removes one buffer chamber, thereby shortening the gas equilibrium time and realizing the simultaneous measurement of multiple gases with high sensitivity.

In the figure, 1. metal housing, 2. resonant cavity, 3. buffer chamber, 4. sensitive diaphragm of an acoustic sensor, 5. optical glass window sheet, 6. air inlet, 7. air outlet, 8. laser, 9. multi-cavity semi-open resonant photoacoustic cell, 10. acoustic sensor, 11. phase-locked amplifier, 12. data acquisition card, 13. computer, 14. antinode position of an acoustic wave, and 15. node position of an acoustic wave.

DETAILED DESCRIPTION

The specific examples of the present invention are further described below in conjunction with the accompanying drawings and technical solutions.

Figure 1:
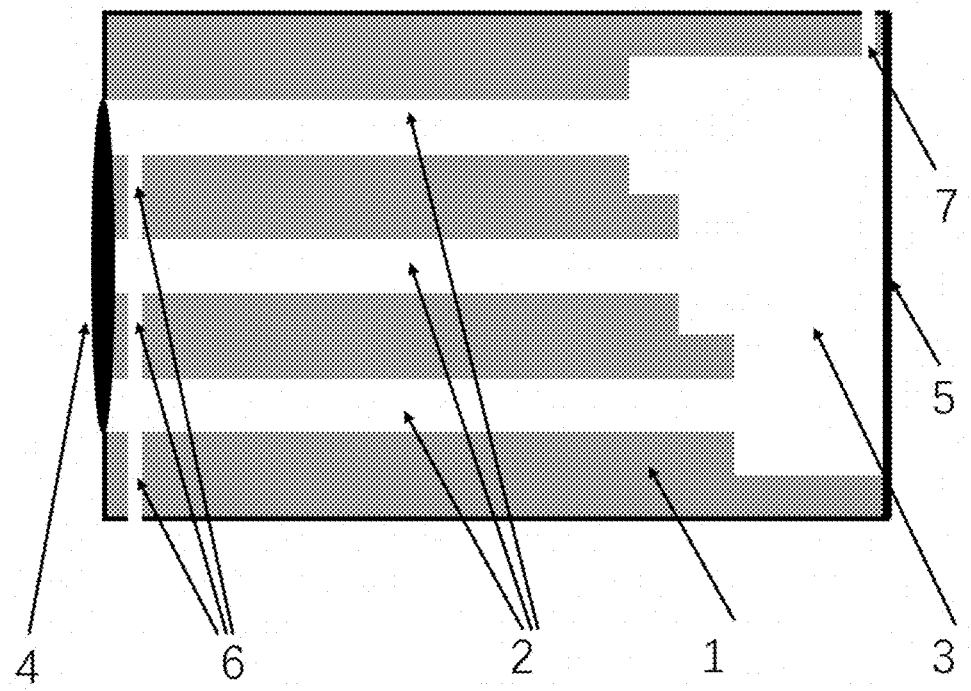
FIG. 1 is a schematic diagram of a multi-cavity semi-open resonant photoacoustic cell.

As shown in FIG. 1, the present invention provides a multi-cavity semi-open resonant photoacoustic cell, including a cylindrical metal housing 1, multiple resonant cavities 2, a buffer chamber 3, a sensitive diaphragm 4 of an acoustic sensor, an optical glass window sheet 5, an air inlet 6, and an air outlet 7. The metal housing 1 of the photoacoustic cell includes the multiple resonant cavities 2. The resonant cavities 2 have different lengths, and therefore their resonant frequencies are different. The sensitive diaphragm 4 of the acoustic sensor is fixed on one end face of the photoacoustic cell. Photoacoustic signals of different frequencies generated in the resonant cavities 2 act on the sensitive diaphragm 4 of the acoustic sensor, causing the sensitive diaphragm 4 of the acoustic sensor to vibrate periodically. Concentration information of multiple to-be-measured gases can be obtained by analyzing the vibration of the sensitive diaphragm 4 of the acoustic sensor. The buffer chamber 3 is provided on the other side of the multiple resonant cavities 2, and the optical glass window sheet 5 is installed at the edge of the buffer chamber 3 to allow excitation light to pass. The air inlet 6 and the air outlet 7 are respectively provided on the side walls near the two ends of the photoacoustic cell. Each resonance cavity is also provided with an air inlet 6 at a position close to the sensitive diaphragm 4 of the acoustic sensor, to increase the gas exchange efficiency.

Figure 2:
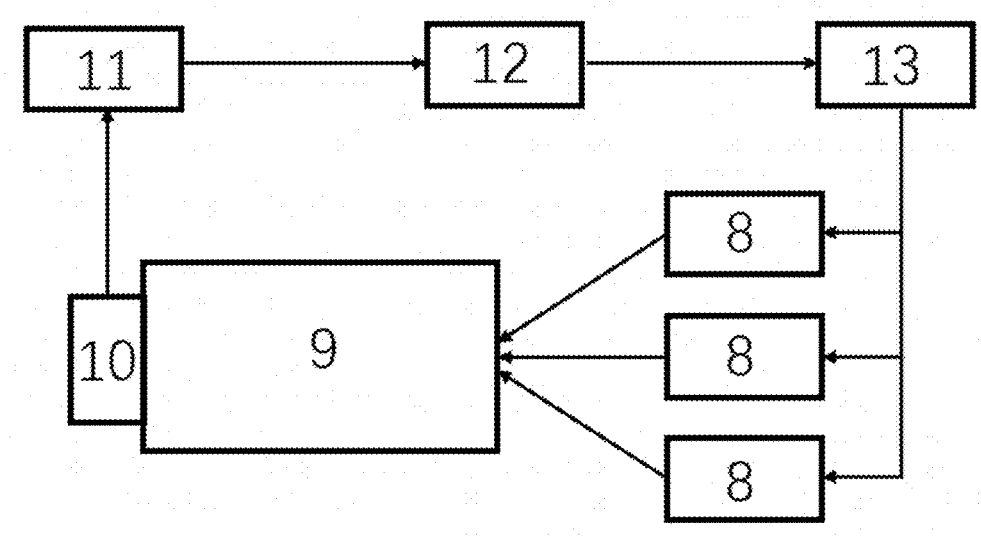
FIG. 2 is a schematic diagram of a multi-gas simultaneous measurement system based on a multi-cavity semi-open resonant photoacoustic cell.

FIG. 2 is a schematic diagram of a multi-gas simultaneous measurement system based on a multi-cavity semi-open resonant photoacoustic cell. The periodic narrowband light beams emitted by the multiple lasers 8 pass through the optical glass window sheet 5 and enter into the multiple resonant cavities 2 in the multi-cavity semi-open resonant photoacoustic cell 9. Each resonant cavity 2 corresponds to one to-be-measured gas. The multiple to-be-measured gases absorb the periodically modulated narrowband light in the multiple resonant cavities 2 to generate photoacoustic signals. The photoacoustic signals of different frequencies detected by the acoustic sensor 10 are processed by the phase-locked amplifier 11, collected by the data acquisition card 12, and then input to the computer 13.

Figure 3:
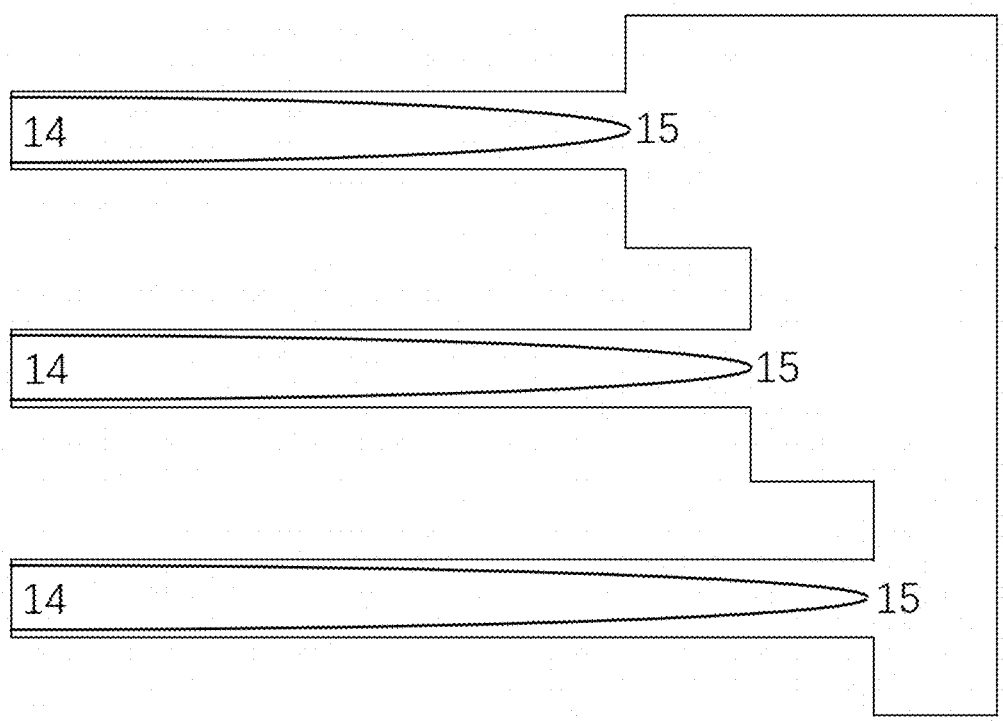
FIG. 3 is a schematic diagram of sound field distribution inside the resonant cavities of a multi-cavity semi-open resonant photoacoustic cell.

FIG. 3 shows the distribution of sound waves in multiple resonant cavities 2 of a multi-cavity semi-open resonant photoacoustic cell proposed by the present invention. On the left side of the resonant cavity 2 is an antinode position 14 of a sound wave, and a position where the right side of the resonant cavity 2 intersects with a buffer chamber 3 is a node position 15 of the sound wave.

The foregoing is merely illustrative of the preferred examples of the present invention and is not intended to limit the present invention, and various changes and modifications may be made by those skilled in the art. Any modifications, equivalent substitutions, improvements, etc. made within the spirit and scope of the present invention should be included within the protection scope of the present invention.

What is claimed is:

1. A multi-cavity semi-open resonant photoacoustic cell, wherein the multi-cavity semi-open resonant photoacoustic cell is of a semi-open cavity resonant photoacoustic cell structure, and comprises a cylindrical metal housing (1), multiple resonant cavities (2), a buffer chamber (3), a sensitive diaphragm (4) of an acoustic sensor, an optical glass window sheet (5), an air inlet (6), and an air outlet (7);

the metal housing (1) comprises the multiple resonant cavities (2); each resonant cavity (2) has a unique length and a unique resonant frequency, so each resonant cavity (2) corresponds to one to-be-measured gas; the metal housing (1) is a cylinder, with the sensitive diaphragm (4) of the acoustic sensor fixed on one end face; photoacoustic signals of different frequencies generated in the multiple resonant cavities (2) act on the sensitive diaphragm (4) of the acoustic sensor, causing the sensitive diaphragm (4) of the acoustic sensor to vibrate periodically; the buffer chamber (3) is provided on the other side of the multiple resonant cavities (2), and the optical glass window sheet (5) is installed at the edge of the buffer chamber (3) to allow excitation light to pass; the air inlet (6) and the air outlet (7) are respectively provided on the side walls near the two ends of the photoacoustic cell; and each resonance cavity is also provided with an air inlet (6) at a position close to the sensitive diaphragm (4) of the acoustic sensor, to increase the gas exchange efficiency.

* * * * *